United States Patent [19]
Nunez

[11] 3,809,514
[45] May 7, 1974

[54] MACHINE FOR THE CONTINUOUS MANUFACTURE OF HOLLOW ELEMENTS

[76] Inventor: Julio De Castro Nunez, Arrieta 7, Madrid, Spain

[22] Filed: Nov. 9, 1972

[21] Appl. No.: 305,138

[30] Foreign Application Priority Data
Nov. 13, 1971 Spain .................................. 397.008
July 7, 1972 Spain .................................. 404.657

[52] U.S. Cl.................. 425/112, 425/115, 425/363, 425/371, 425/460, 425/471
[51] Int. Cl. .............................................. B29c 3/02
[58] Field of Search ........... 425/460, 471, 363, 371, 425/112, 115

[56] References Cited
UNITED STATES PATENTS
2,297,163  9/1942  Perkins ............................. 425/460
3,106,006  10/1963  Perovich ........................... 425/460
3,167,837  2/1965  Matheny ........................... 425/460
3,276,092  10/1966  Pankow ............................ 425/224
3,366,719  1/1968  Leuders .......................... 425/4 C X Primary Examiner—Robert L. Spicer, Jr.
Attorney, Agent, or Firm—Henry M. Bissell

[57] ABSTRACT

The present invention relates to the moulding of a hollow element which is made on a mould equipped with rotary means on its periphery which impart to a continuous band supported on the said means a helicoidal movement that imparts to the layer of the hollow element on the surface thus formed a continuous longitudinal and rotary displacement, following the said movement.

7 Claims, 10 Drawing Figures

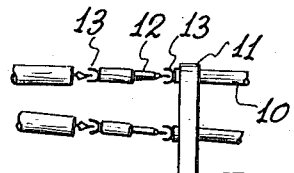
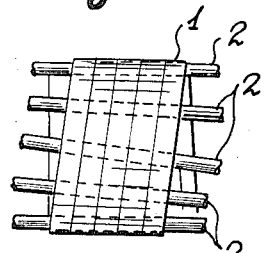
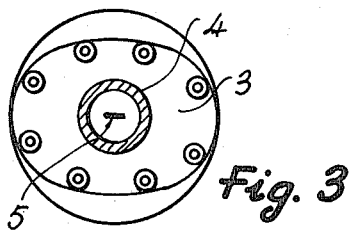
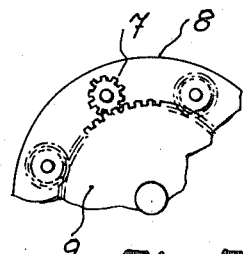
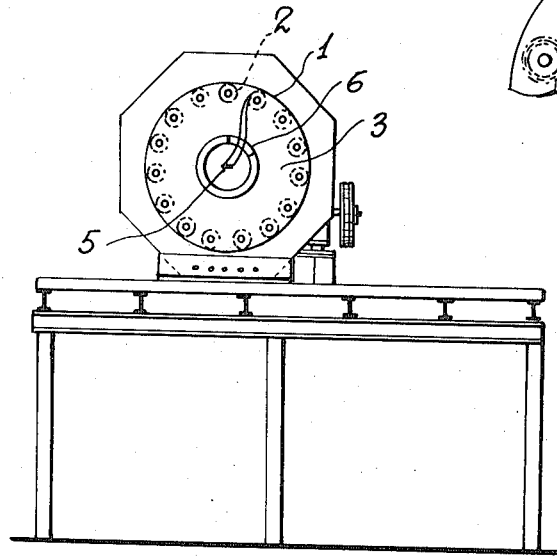

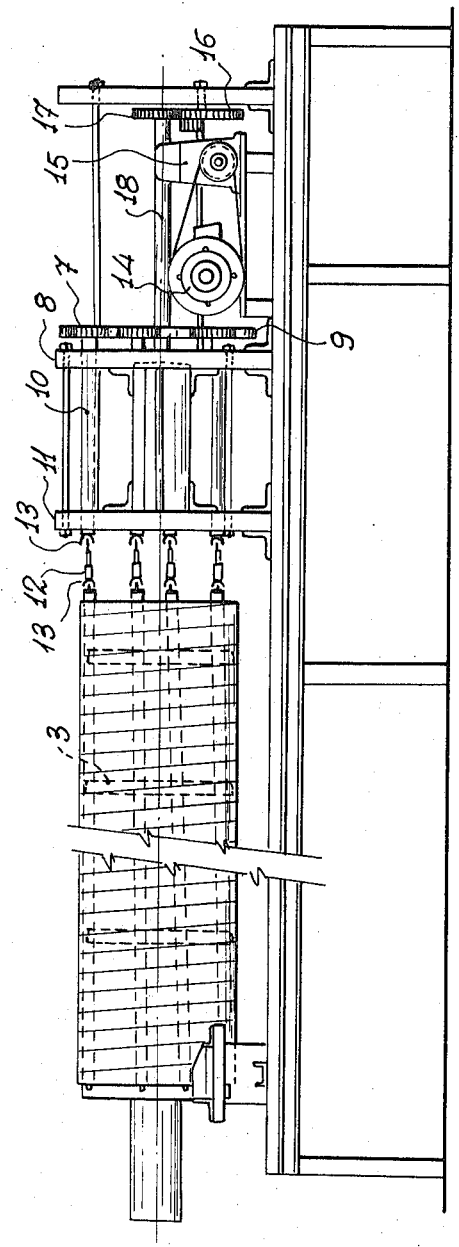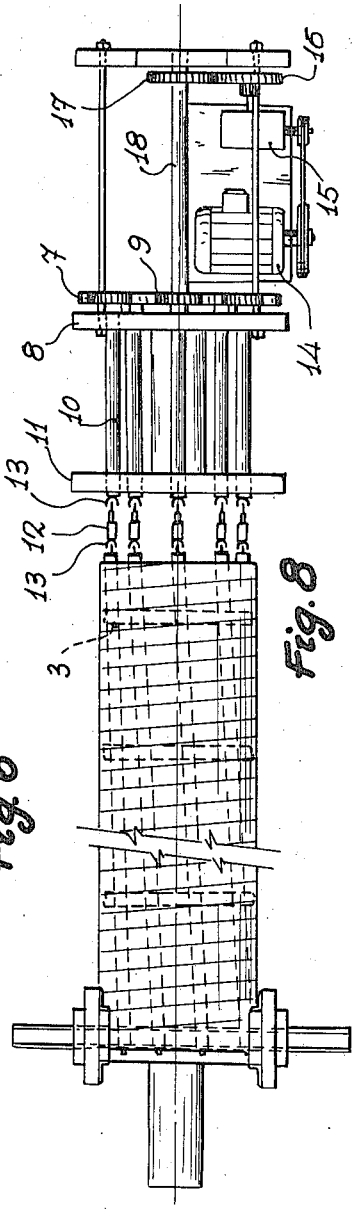

MACHINE FOR THE CONTINUOUS MANUFACTURE OF HOLLOW ELEMENTS

The purpose of the machine that constitutes the subject of the present invention is the continuous manufacture of hollow elements, the interior of which is reinforced, which are subsequently cut in order to form lengths of the desired longitude.

At the present time, the manufacture of the hollow elements is effected in machines which only permit the obtention of units of fixed length, tht is to say, by elements, so that when this method is compared with the system of continuous manufacture advocated by the present invention there is an evident advantage in favour of the latter, specially because of the reduction in time represented by the elimination of the phase of withdrawal from moulds of the existing manufacturing process.

In accordance with the present invention, the moulding of the hollow element is made on a mould equipped with rotary means on its periphery which impart to a continuous band supported on the said means a helicoidal movement that imparts to the layer of the hollow element on the surface thus formed a continuous longitudinal and rotary displacement, following the said movement.

The said rotary means are rollers guided by intermediate support, fixed to a central tubular framework, which rollers are situated with a certain inclination with respect to the axial plane of the whole assembly in order that the said rollers may be substantially perpendicular to a band made of steel strip or other material wound on the complex of rollers. The said band is continuous and is moved in a helicoidal manner, impelled by the rollers that serve as a support for it on the said rollers turning simultaneously, returning from the outlet end to the inlet end through the interior of the hollow support framework previously mentioned.

Consequently, the said band forms a closed surface that moves in a helicoidal manner, which makes it possible to carry out continuous moulding on it, and to bring about the obtention of the hollow element simultaneously with a continuous displacement of the moulded material, which, now solidified, reaches the return end of the band, at which point withdrawal from the mould is produced automatically and continuously.

Another important characteristic of the machine constituting the subject of this invention is that, within certain limits, it is possible to vary the form and dimension of the moulding section, for which purpose it is sufficient to adjust the intermediate support of the rollers to the corresponding contour. For this reason, the rollers are driven by means of Cardan systems and extensible shafts, which permit the said operation to be carried out.

In order to enable the invention to be better interpreted, in the annexed drawings, which complement the present description, a practical form of implementation is represented, which is included with a merely informative character and is not limitative with respect to the invention.

In the said drawings:

FIG. 1 shows a schematic representation of the principle of functioning characteristic of the machine.

FIG. 2 shows a detail, in a lateral view, of the mould of the machine.

FIG. 3 shows a cross-section of a mould of oval section.

FIG. 4 shows a detail of the system of transmission of movement to the rollers of the helicoidal band.

FIG. 5 shows a detail of the mechanism for moving the rollers.

FIG. 6 shows a lateral view of a machine constructed in accordance with the invention.

FIG. 7 shows a view of the outlet end of the machine.

FIG. 8 shows a plan view of the same machine.

Figure 9:
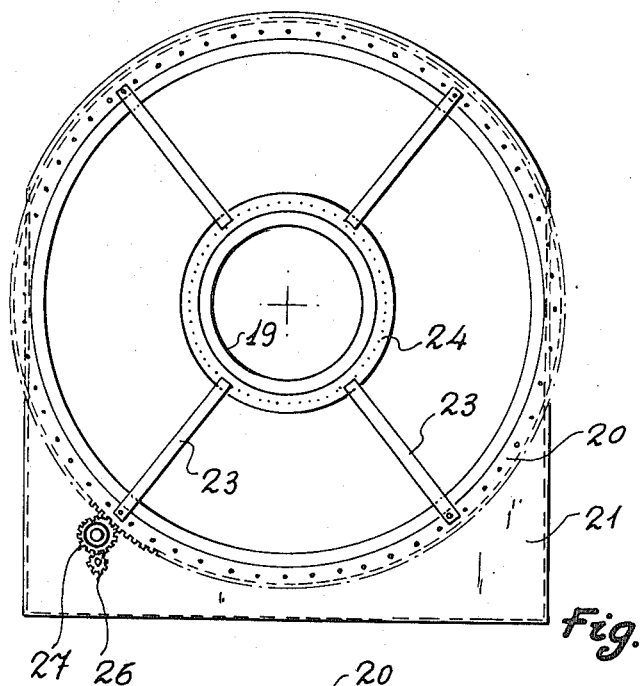

In the said Figures, the numerical references correspond to the following elements of the machine:

1.-Helicoidal band

2.-Support roller

3.-Intermediate support

4.-Principal support

5.-Return branch of the continuous band

6.-Inlet or outlet window

7.-Toothed pinion

8.-Posterior plate of the head

9.-Toothed wheel

10.-Shaft

11.-Anterior plate of the head

12.-Extensible shaft

13.-Cardan Joint

14.-Motor

15.-Reduction gearbox

16.-Toothed wheel

17.-Toothed wheel

18.-Principal shaft

As has been previously stated, the fundamental idea of the exemption consists of the moulding of the hollow element on a mould whose surface presents a continuous helicoidal movement, so that the material moulded does not present relative movements with respect to the said surface.

In accordance with the invention, the said moulding surface is constituted, as is shown in FIG. 1, by a continuous band of flexible material, capable of resisting, without varying its mechanical characteristics, the temperature of moulding (if necessary), which continuous band has its outer branch wound in a helicoidal manner and submitted to a movement of translation imparted by rollers upon which it is supported, and a rectilinear return branch the whole assembly being moved in accordance with the arrows that are shown in the said Figure.

In the normal form of embodiment of the invention, the helicoidal enveloping part of the band has its spirals joined, as is shown in the remaining Figures.

The said spirals (1) form a closed surface which can have a circular or ellipsoidal contour or any other contour that permits the arrangement of its support rollers (2) to move in accordance with a continuous helicoidal movement from one end to the other. The material to be moulded projected on the elements incorporated in the said surface naturally moves with the said helicoidal movement, that is to say, of combined advance and rotation, thus permitting the continuous moulding of pipes.

The support rollers (2) are longitudinally arranged, and are supported in turn on supports (3) whose contour presents the form of the tubular element to be moulded. For example, in the case of FIG. 3, the supports are ellipsoidal. The said tubular elements present a certain inclination in the same direction with respect to the axial median plane, operating as generatrices of a ruled surface. The said inclination is determined by the width of the continuous band, since the latter must be supported along the whole of its width on them, it being necessary for this purpose that the spiral of the band (1) form a right angle with the support. Consequently, the narrower the band is, the lesser will the said inclination be, and the surface generated will approximate more to a cylindrical surface.

The intermediate supports (3) are fixed in turn to a tubular support (4) fixed to the structure of the machine, through which there passes longitudinally the return branch (5) of the continuous band, passing through the windows (6) opened at both ends.

The driving mechanism of the rollers is constituted by the toothed pinions (7) distributed in a circular manner on the plate (8), with which the toothed wheel (9) meshes. The said pinions (7) are solidly joined to the respective shafts (10) fitted between the plate (8) and the plate (11), which form the head of the machine, the ends of the said shaft emerging from the front of the plate (11), whose ends are coupled to the corresponding rollers (2) by means of a system consisting of an extensible shaft (12) and Cardan joints (13).

The said coupling permits, in the first place, the transmission of movement with the angle of inclination necessary in the rollers and, in the second place, the adaptation of the arrangement of the said rollers to the contour of the moulding surface that is desired.

Thus, for example, in FIGS. 3 and 4, the moulding surface is ellipsoidal, and the position of the driving shafts is circular.

It is evident that machines can be constructed to produce substantially rectangular moulding surfaces, for which purpose it is sufficient to modify the driving system, maintaining the same fundamental principle of the invention, that is to say the continuous band wound in a helicoidal manner.

The driving system, which can be clearly seen in FIG. 6 is constituted by an electric motor (14), which moves, by means of trapezoidal belts, the reduction gearbox (15). The output shaft of the latter moves by means of the toothed wheel (16), the toothed wheel (17), fixed to the shaft (18) on which the toothed wheel (9) is fitted, which wheel meshes with the pinions (7), as has already been described.

The manufacture of the hollow elements is carried out by placing longitudinal strips of fibre and bands of the same fibre wound in a helicoidal manner, both following the movement of the mould, on which there is continuously moulded the layer of polyester.

In addition, the machine includes exterior or interior means of heating in order to produce the necessary hardening of the moulded material, while the latter emerges, already endowed with sufficient consistency, continuously through the return end of the band (1).

The tube thus manufactured can be wound on a drum, or be cut off by means of an auxiliary cutting device which, evidently, must move with the tube longitudinally during the cutting operation, and return to the starting point once this operation has been completed.

With the elements included in this machine, there is achieved the continuous manufacture of a tube which, in view of the rotary movement of the moulding surface (an endless band) can be perfectly reinforced in a radial direction, but reinforced only with great difficulty in the longitudinal direction of the piece, since the fact is, because of the said movement, the applications of the longitudinal strips do not situate these perfectly parallel to the axis of rotation, but by adapting a helicoidal position with respect to the said axis, which considerably reduces the tensile strength of the hollow element or tube manufactured.

With the aim of eliminating the disadvantages, a device has been created which permits the incorporation into the hollow element or tube manufactured of a series of a variable number of longitudinal resistant tension members which are applied to the surface of the said hollow element, appropriately distributed on its periphery and with a perfect parallelism between them and with respect to the geometric axis of rotation of the assembly.

The said device is situated immediately after the outlet of the moulding machine, and includes a crown wheel through the interior of which the manufactured tube is caused to pass, which crown wheel is endowed with an angular velocity exactly equal to that of the said tube, which is achieved by means of a variable reducer motor complex coupled directly to the said crown wheel. The crown wheel has the adequate means of assembly for a variable series of reels which have wound on them the wire or cable that is to constitute the resistant tension members, and also serves as support for a circular wire guide that rotates jointly with the said crown wheel and which has an internal diameter which is very closed to the external diameter of the hollow element or tube which it is desired to reinforce longitudinally.

The equality of the angular velocities of the tube and of the crown wheel produce the result of the superficial abutment to the tube of resistant longitudinal tension members which are delivered by the reels by the influence of the axial displacement of the said tube, the only displacement to be considered, since the rotary movement has the same angular value in the tube and in the complex formed by the crown wheel and the wire guide.

In order that the object of the invention may be better understood, and only by way of example, the following are shown in the sheets of drawings:

FIG. 9, which represents the front view of the device for the application of resistant longitudinal tension members to which we have referred.

Figure 10:
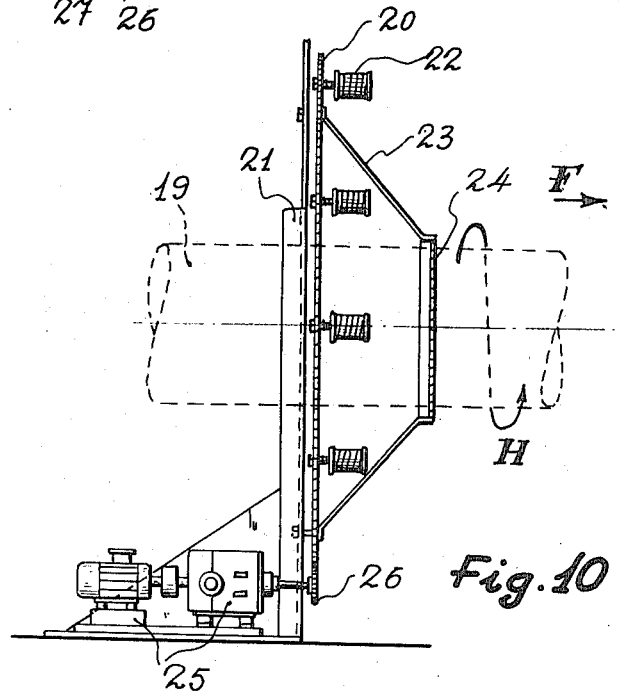

FIG. 10, which shows the lateral view of the device shown in FIG. 9.

In the said illustrations and in the following description the elements constituting the whole and its principal parts have been designated with numerical references in accordance with the following nomenclature:

19.-Hollow elements or tubes
20.-Crown wheel
21.-Fixed framework
22.-Reels
23.-Radial-oblique arms
24.-Annular wire guide
25.-Variable reducer motor complex
26.-Driving pinion
27.-Intermediate pinion With reference to the said illustration, we can see that the hollow element (19) at the outlet of the moulding machine is endowed with a rotary movement combined with a longitudinal forward movement, as indicated by the arrow "F," which constitutes a helicoidal forward movement, as indicated by the arrow "H."

The said hollow element or tube (19) travels coaxially through the interior of a crown wheel (20) supported in its rotation by means fixed to a fixed framework (21) and serving as a support, in turn, for a variable number of reels (22) which are distributed on its circumference, and for a set of radial-oblique arms (23) which situate in a more advanced position an angular wire-guide (24), whose inner diameter is concentric with and very closed to the external surface of the tube (19).

The fixed framework (21) has solidly united to it a horizontal plate on which there is assembled the variable reducer motor complex (25) whose output shaft passes to the front part and has united to it a driving pinion (26) which, either directly or by means of an intermediate pinion (27), meshes with the above-mentioned crown wheel (20), causing it to rotate at an angular velocity which, after the necessary corrections, should be equal to the angular velocity imparted to the hollow element or tube (19) in order to ensure that the latter, with respect to the complex of reels (22) and wire-guide (24) will move only in an axial direction, as indicated by the arrow "F."

The resistant tension members which, proceeding from the reels (22) are applied by the annular wire-guide (24) to the external surface of the hollow element or tube (19), are equidistant and parallel with respect to one another and with respect to the geometrical axis of the tube, in accordance with the end proposed.

The circumstances of size, form and material particularly referred to each one of the elements that constitute the whole are variable, and in the said whole there may be varied all that which does not suppose an alteration of the essence of the object expounded in the foregoing description, which should be taken in its broadest sense and not as a limitation of possibilities of embodiment.

What is claimed is:

1. A machine for the continuous manufacture of hollow elements, characterised in that it includes a mould whose moulding surface is constituted by a continuous band wound in a helicoidal manner on a set of rollers appropriately distributed to shape the contour of the moulding surface, which rollers are supported in a form susceptible to rotation on separating elements, fixed to a central hollow support, through the interior of which there passes the return branch of the continuous band, which rollers are moved synchronously by a driving mechanism, in such a manner that they move the whole of the helicoidal enveloping part from the inlet end of the continuous band to the outlet end, which band returns through the interior of the inlet end, on whose surface there are situated, by employing appropriate means, the bands of fibres that constitute the internal reinforcement of the element moulded in accordance with a longitudinal and helicoidal arrangement, and the material to be moulded is projected and follows the helicoidal movement of the surface during the whole process of moulding and polymerization.

2. A machine for the continuous manufacture of hollow elements, in accordance with claim 1, characterised in that the rollers present a certain inclination with respect to the axial plane of the complex in order to be situated in a perpendicular position with respect to the spirals of the part of the band wound in a helicoidal manner on the set of the said rollers.

3. A machine for the continuous manufacture of hollow elements, in accordance with claim 1, characterised in that the supporting structure of the set of rollers is constituted by an axial hollow element, fitted with windows for the passage of the continuous band and its return to the starting end through its interior, which hollow element supports separating elements, arranged in a transverse manner, with a peripheral form corresponding to the form of the moulding surface and fitted with means for the support and rotation of the rollers.

4. A machine for the continuous manufacture of hollow elements, in accordance with claim 1, characterised in that the rollers receive movement through two Cardan joints with an intermediate extensible shaft which joins them to respective toothed pinions which form part of a driving mechanism fitted in a head, in such a manner that it is possible to distribute the said rollers in accordance with the form of the moulding surface desired.

5. A machine for the continuous manufacture of hollow elements, in accordance with claim 1, characterised in that the toothed wheels are distributed in a circular manner in the head and mesh with a common toothed wheel driven through a speed reducer by a motor, which toothed wheel imparts to all the pinions, and consequently to the rollers, the same speed of rotation.

6. A machine for the continuous manufacture of hollow elements, in accordance with claim 1, which includes a device which permits the incorporation into the hollow element or tube manufactured of a series of a variable number of resistant longitudinal tension members parallel to one another and with respect to the axis of rotation of the said hollow element, characterised in that the said device is situated immediately after the outlet of the moulding machine in such a manner that the said hollow element travels coaxially through the interior of a crown wheel which is supported in its rotation by means fixed to a fixed framework and which, in turn, serves as a support for a variable number of reels that have wound upon them the wire or cable constituting the resistant longitudinal tension members, which are distributed on the circumference, and a set of radial-oblique arms which situate in a more advanced position an annular wire-guide whose inner diameter is concentric with and very closed to the outer surface of the moulded tube.

7. A machine for the continuous manufacture of hollow elements, in accordance with claim 1, characterised in that the fixed framework has solidly united to it a horizontal plate on which there is mounted a variable reducer motor complex whose output shaft passes to the front part and has fixed to it a driving pinion which, either directly or through an intermediate pinion, meshes with the crown wheel causing it to rotate at an angular velocity which should be equal to the angular velocity imparted to the hollow element or tube in order to ensure that the latter, with respect to the set of reels and wire-guide moves only in the axial direction that determines the movement of the resistant tension members in the parallel situation mentioned above.

* * * * *